United States Patent
Roberge

(10) Patent No.: US 9,982,628 B2
(45) Date of Patent: May 29, 2018

(54) EXHAUST SYSTEM HAVING A FLOW PATH LINER SUPPORTED BY STRUCTURAL DUCT SEGMENTS

(71) Applicant: UNITED TECHNOLOGIES CORPORATION, Hartford, CT (US)

(72) Inventor: Gary D Roberge, Tolland, CT (US)

(73) Assignee: United Technologies Corporation, Farmington, CT (US)

(*) Notice: Subject to any disclaimer, the term of this patent is extended or adjusted under 35 U.S.C. 154(b) by 448 days.

(21) Appl. No.: 14/771,243

(22) PCT Filed: Feb. 11, 2014

(86) PCT No.: PCT/US2014/015788
§ 371 (c)(1),
(2) Date: Aug. 28, 2015

(87) PCT Pub. No.: WO2014/137553
PCT Pub. Date: Sep. 12, 2014

(65) Prior Publication Data
US 2016/0003192 A1 Jan. 7, 2016

Related U.S. Application Data

(60) Provisional application No. 61/773,251, filed on Mar. 6, 2013.

(51) Int. Cl.
*F02K 1/82* (2006.01)
*F01D 25/08* (2006.01)
(Continued)

(52) U.S. Cl.
CPC .............. *F02K 1/822* (2013.01); *F01D 25/08* (2013.01); *F01D 25/243* (2013.01); *F01D 25/26* (2013.01);
(Continued)

(58) Field of Classification Search
CPC ... F23R 3/60; F02K 1/822; F02K 1/80; F02K 1/82; F01D 25/243; F01D 25/26;
(Continued)

(56) References Cited

U.S. PATENT DOCUMENTS

| 4,441,313 A | * | 4/1984 | Joubert | B64D 27/26 |
| | | | | 138/113 |
| 5,088,279 A | * | 2/1992 | MacGee | F02C 7/20 |
| | | | | 60/226.1 |

(Continued)

FOREIGN PATENT DOCUMENTS

| EP | 0843090 | 5/1998 |
| EP | 1607582 A1 | 12/2005 |
| EP | 1887209 | 2/2008 |

*Primary Examiner* — Craig Kim
*Assistant Examiner* — Stefan Ibroni
(74) *Attorney, Agent, or Firm* — Bachman & LaPointe, PC

(57) ABSTRACT

The exhaust system (60) includes an exhaust flow path liner (62) surrounded and supported by a plurality of structural duct segments (64, 70). Pluralities of links (84) are secured to and extend between the duct segments (64, 70) and the liner (62). A duct end (88) of the link includes a lock member (96) having a diameter greater than a width of the stem (86). The lock member (96) is configured to be secured within a capture nest (98) defined between and within adjacent junction flanges (76, 80} of the structural duct segments {64, 70) when the segments (64, 70) are secured to each other to secure the segments (64, 70) together. A catch member (100) at an opposed end of the link (84) is secured to a capture node (102) at the exhaust liner (62).

14 Claims, 5 Drawing Sheets

(51) Int. Cl.
    *F01D 25/28* (2006.01)
    *F01D 25/30* (2006.01)
    *F02C 7/18* (2006.01)
    *F23R 3/00* (2006.01)
    *F01D 25/24* (2006.01)
    *F01D 25/26* (2006.01)
    *F02C 7/20* (2006.01)

(52) U.S. Cl.
    CPC ............. *F01D 25/28* (2013.01); *F01D 25/30* (2013.01); *F02C 7/18* (2013.01); *F02C 7/20* (2013.01); *F23R 3/005* (2013.01); *F05D 2230/642* (2013.01); *F05D 2250/241* (2013.01); *F05D 2260/30* (2013.01); *Y02T 50/675* (2013.01)

(58) Field of Classification Search
    CPC .... F01D 25/28; F01D 25/30; F05D 2230/642; F05D 2260/30; F23M 5/04; F02C 7/20

USPC ....... 285/121.7, 137.1, 146.1, 146.3; 403/56, 403/114

See application file for complete search history.

(56) References Cited

U.S. PATENT DOCUMENTS

| | | | |
|---|---|---|---|
| 6,041,590 A * | 3/2000 | Hayton | F02K 1/822 60/766 |
| 7,237,388 B2 | 7/2007 | Aumont et al. | |
| 7,975,488 B2 * | 7/2011 | Farah | F02C 7/20 60/770 |
| 2009/0077978 A1 | 3/2009 | Figueroa et al. | |
| 2009/0145133 A1 | 6/2009 | Murphy | |
| 2009/0293498 A1 | 12/2009 | Petty et al. | |
| 2009/0317175 A1 * | 12/2009 | Martinez | F02K 1/80 403/24 |

* cited by examiner

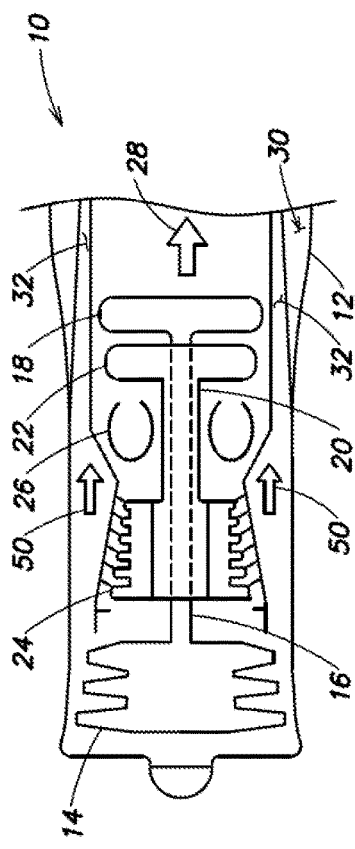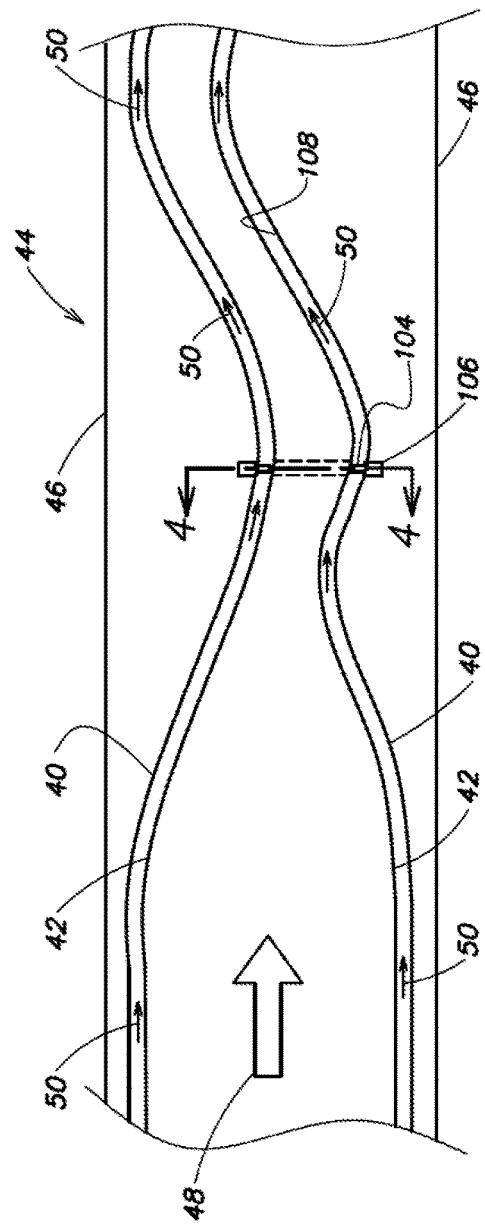

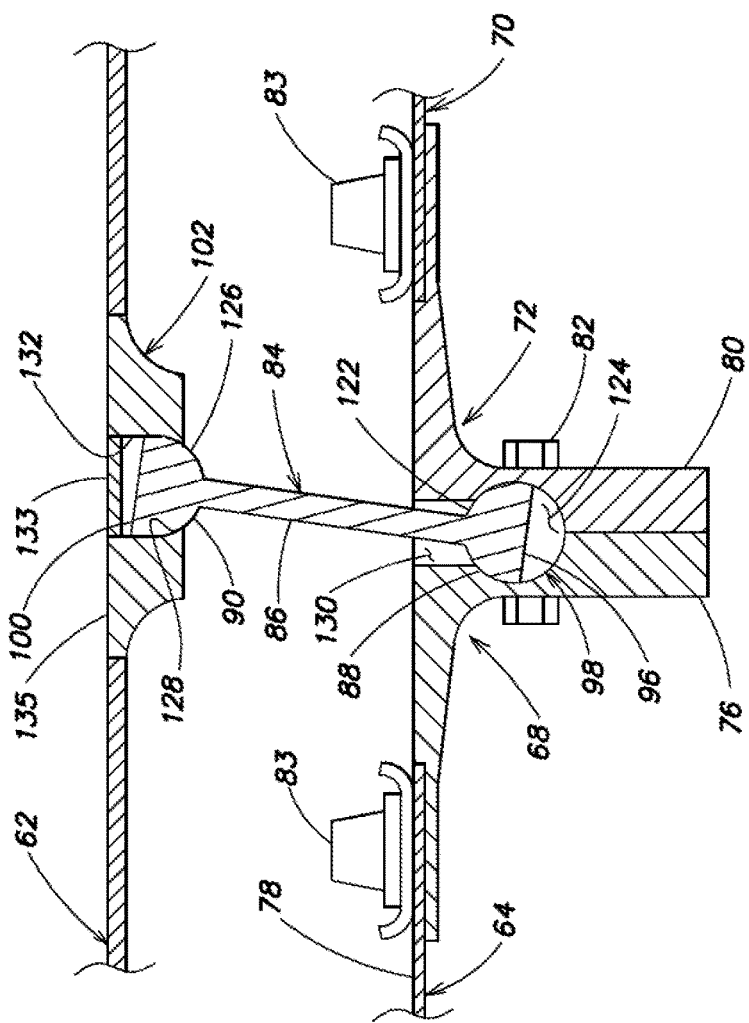
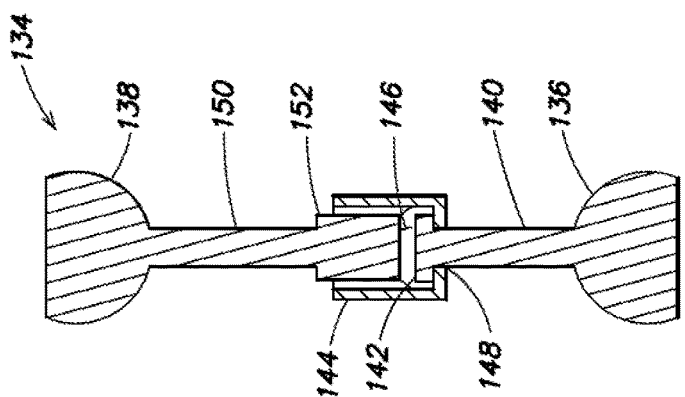
FIG. 6
FIG. 7

EXHAUST SYSTEM HAVING A FLOW PATH LINER SUPPORTED BY STRUCTURAL DUCT SEGMENTS

CROSS-REFERENCE TO RELATED APPLICATION

This Application claims the benefit of U.S. Provisional Patent Application Ser. No. 61/773,251 that was filed on Mar. 6, 2013, entitled "EXHAUST SYSTEM. HAVING A FLOW PATH LINER SUPPORTED BY STRUCTURAL DUCT SEGMENTS."

TECHNICAL FIELD

The present disclosure relates to an exhaust system for a gas turbine engine, and in particular relates to an improved apparatus and method for securing an exhaust flow path cooling liner to structural duct segments.

BACKGROUND ART

In the field of gas turbine engines it is necessary to protect a liner that directs flow of an extremely hot exhaust stream out of the engine. This is typically done by utilizing, high-temperature metal alloys or other high-temperature materials to form the exhaust flow liner and then supporting the liner within a surrounding exhaust duct that directs flow of cooling air between the exhaust duct and the adjacent exhaust flow liner and out of the engine with the exhaust stream. The exhaust duct provides a cooling conduit defined by the space between the liner outer surface and exhaust duct inner surface delivering cooling flow to the liner and permits usage of lower-temperature tolerant metals outside of the exhaust duct.

Modern gas turbine engines include exhaust systems having increasingly complex geometries. For example, U.S. Pat. No. 7,721,522 shows at FIGS. 2A and 2B an exhaust system that changes its geometry in operation of the engine for utilization in thrust vectoring. Additionally, gas turbine exhaust systems are subject to extraordinary mechanical stresses through vibration and thermal expansion. Some exhaust systems utilize complex profiles to acquire geometries that tailor signatures in an attempt to meet imposed propulsion system requirements. Consequently, securing or hanging the exhaust flow liner to or within the surrounding exhaust duct has typically required extraordinarily complex apparatus that are costly to manufacture, and extremely time-consuming to assemble and disassemble for servicing.

For example, U.S. Pat. No. 7,866,158 discloses an exhaust liner attachment system that provides secure hanging of the exhaust flow liner within the exhaust duct but involves complex and costly securing components that are typical of known exhaust flow liner hanging systems. U.S. Pat. No. 7,861,535 also shows an exhaust flow liner support hanger that includes self-aligning securing components, as described in the sequence of FIGS. 4-6. The components include a rod extending between ball joints secured to the exhaust duct and liner that permits limited motion of the liner relative to the exhaust duct. (The aforesaid three U.S. Patents are owned by the owner of all rights in the present disclosure.) As is apparent however, this and other known disclosures require that the rod, pin or link extending between the exhaust duct and the liner be secured to intricate attachments affixed to flow surfaces of the exhaust duct and flow liner. This in turn requires precise alignment of the attachments during assembly which is often very time consuming and extremely costly in terms of precision required in manufacturing the exhaust duct and flow liner segments to achieve necessary assembly tolerances.

Therefore, there is a need for an improved exhaust system having an exhaust flow path liner supported by a duct that minimizes costs and complexities of manufacture, assembly and disassembly.

SUMMARY OF THE INVENTION

The disclosure is an exhaust system for an apparatus that generates a hot exhaust stream that includes an exhaust flow path liner surrounding and defining an exhaust stream flow path. A first structural duct segment has an entry end, an opposed exit end, and a second structural duct segment also has an entry end and an opposed exit end. The structural duct segments include at each entry and exit end a junction flange extending about perpendicular to and away from interior flow surfaces of the segments. A first junction flange at the exit end of the first duct segment is configured to mate with a second junction flange at the entry end of the second duct segment to secure the first and second structural duct segments together. The system also has at least one link for securing the mated first and second structural duct segments to the exhaust flow path liner. The link includes a stem extending between a duct end and an opposed liner end of the link. The duct end of the link includes a lock member having a diameter greater than a width of the stem. The lock member is also configured to be secured within a capture nest that is cooperatively defined within adjacent junction flanges of the structural duct segments. The stem of the link extends out of the capture nest in a direction away from the lock member and toward the exhaust flow liner. The liner end of the link includes a catch member configured to be secured to an attachment node defined at the exhaust flow path liner so that the link secures the exhaust flow path liner to the structural duct segments.

The disclosure also includes at least one of the first structural duct segment and the second structural duct segment including at least a first segment portion and a second segment portion configured so that the first and second segment portions cooperatively secure to each other to form the at least first structural duct segment completely surrounding the exhaust flow liner.

The disclosure additionally includes the lock member of the duct end of the link forming a spherical section and the capture nest defining a spherical cavity so that the lock member is pivotally secured within the capture nest to thereby provide for pivoting motion of the stem. Additionally, the catch member at the liner end of the stem may also form a spherical section, and the attachment node may also define a spherical cavity so that the catch member is pivotally secured within the attachment node to thereby provide for pivoting of the stem extending from the attachment node.

In another aspect of the disclosure, to more firmly secure the duct end of the stem within the capture nest defined by the junction flanges, the capture nest may include an access channel defined between a base of the capture nest and a flow surface of the duct segment. The access channel may also define a width that is greater than a width of the stem. This permits pivoting motion of the stem within the access channel whenever the lock member is a spherical section secured within a spherical cavity defined by the capture nest.

In a further aspect of the disclosure, the attachment node on the exhaust flow liner may define a throughbore dimensioned to permit passage of the duct end of the link and the stem to pass through the throughbore. This permits assembly of the exhaust system by extending the duct end of the stem and the stem through the attachment node throughbore, after which the duct end is secured within the capture nest of the exhaust duct segments as the segments are secured to each other. In a further embodiment, the lock member of the duct end of the link may have a greatest diameter that is less than a greatest diameter of the throughbore of the attachment node, and the catch member of the liner end of the stem may have a greatest diameter that is greater than the greatest diameter of the lock member and that is less than a greatest diameter of the throughbore of the attachment node. This permits the duct end to pass through the throughbore of the attachment node, while the liner end is restricted from passing through the throughbore of the attachment node.

The disclosure also includes a method of securing a plurality of structural duct segments to an exhaust flow path liner. The method includes securing a catch member of a liner end of a stem to an attachment node on the exhaust flow liner; positioning a lock member of a duct end at the opposed end of the stem within a capture nest cooperatively defined within adjacent junction flanges of a first exit end of a first structural duct segment and a second entry end of a second structural duct segment; and then, securing the adjacent junction flanges to each other thereby securing the lock member of the duct end of the stem within the capture nest of the adjacent junction flanges so that the stem extends from the capture nest in a direction above a flow surface of the secured structural duct segments to the exhaust flow liner, thereby securing the structural duct segments to the exhaust flow liner.

Accordingly, it is a general purpose of the present disclosure to provide an exhaust system having a flow path liner supported by structural duct segments that overcomes deficiencies of the prior art.

It is a more specific purpose of the present disclosure to provide an exhaust system having a flow path liner supported by structural duct segments that enhances efficiencies of manufacture, assembly and installation of the system within complex working environments. These and other purposes and values of the present disclosure will become apparent in the following detailed description and the accompanying drawings.

BRIEF DESCRIPTION OF THE DRAWINGS

FIG. 1 is a simplified schematic drawing showing a gas turbine engine showing a portion of an exhaust system.

FIG. 2 is simplified schematic drawing showing a non-linear disposition of an exhaust duct and an exhaust flow liner of an exhaust system of the present invention.

FIG. 6 is a fragmentary view showing first and second junction flanges of first and second structural duct segments secured to each other and showing a link having a spherical section lock member of a duct end of the link pivotally secured within a capture nest defined by the junction flanges, and showing a catch member of a liner end of the link as a spherical section pivotally secured to an attachment node of an exhaust flow liner to pivotally secure the duct segments to the liner in accordance with the present invention.

FIG. 7 is a simplified plan view of a link of the present invention showing a lock member and a catch member of opposed duct and liner ends of the link in the form of spherical sections and showing an adjustable length stem between the opposed ends.

DESCRIPTION OF THE PREFERRED EMBODIMENTS

Figure 3:
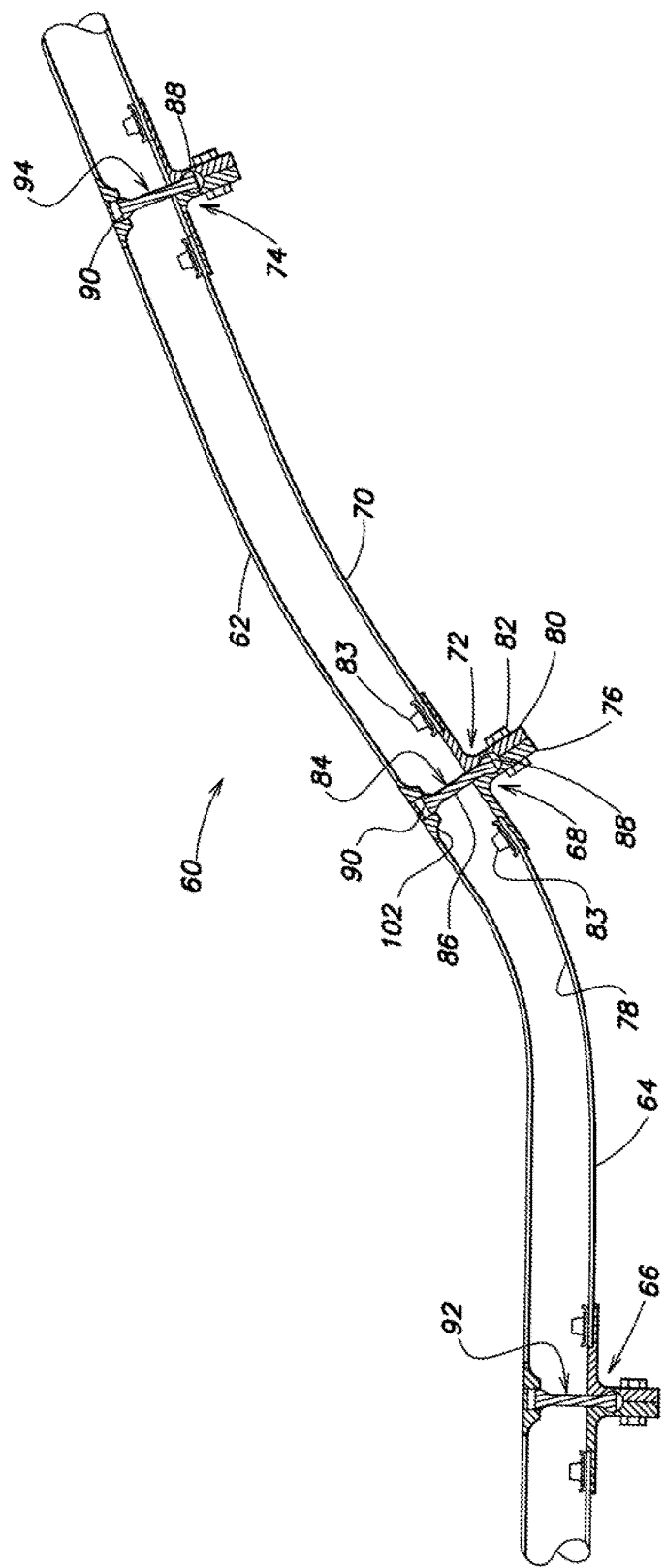
FIG. 3 is a fragmentary, simplified view of a non-linear flow path liner secured to non-linear structural duct segments by a plurality of links in accordance with the present invention.

Referring to the drawings in detail, FIG. 1 shows a simplified, schematic representation of a preferred working environment for the present disclosure; namely a gas turbine engine generally designated by the reference numeral 10. The engine 10 includes a hollow engine casing 12 which includes a variety of components and engine modules (not shown) that are not pertinent to the present disclosure. Within the engine casing 12 is a low pressure fan/compressor section 14 interconnected by a shaft 16 to a low pressure turbine 18 which drives the compressor 14. A second shaft 20 is connected to a high pressure turbine 22 which drives a high pressure compressor section 24. An annular burner or combustor 26 is disposed between the high pressure compressor 24 and the high pressure turbine 22, and the burner 26 serves to combust fuel so that a portion of the energy extracted from hot, increased energy combustion gases powers the turbines which drive the compressors, while remaining energy of the combusted gases produces thrust for driving the gas turbine engine 10 in a desired direction. The combusted gases form an exhaust stream 28 that is directed into an exhaust system 30 while by-pass or non-combusted cooling gas from the low pressure compressor 14 is directed adjacent the exhaust stream 28 within an exhaust duct 32.

FIG. 2 shows a simplified schematic representation of a non-linear disposition of an exhaust duct 40 and an exhaust flow liner 42 of an exhaust system 44 of the present invention. The exhaust system 44 is supported within an aircraft engine bay 46 of a gas turbine engine. In FIG. 2, a flow direction of the high temperature exhaust stream is shown by directional arrow 48, while flow direction of the cooling by-pass air between the exhaust duct 40 and exhaust flow liner 42 is shown by directional arrows 50, that are also shown in FIG. 1.

An exhaust system constructed in accordance with the present invention is best shown in FIG. 3 and is generally designated by the reference numeral 60. The exhaust system 60 includes an exhaust flow path liner 62 surrounding and defining an exhaust stream flow path, such as the exhaust flow path direction 48 shown in FIG. 2. A first structural duct segment 64 has an entry end 66 and an opposed exit end 68. A second structural duct segment 70 also has an entry end 72 and an opposed exit end 74. A first junction flange 76 at the exit end 68 of the first duct segment 64 extends about perpendicular to and away from an interior flow surface 78 of the first segment 64. The first junction flange 76 is configured to mate with a second junction flange 80 at the entry end 72 of the second duct segment 70 to secure the first and second structural duct segments 64, 70 together, such as by a fastening nut/bolt 82 or other suitable fasteners 82 or other securing means appropriate for that function. The first junction flange 76 and second junction flange 80 may be integral respectively with the exit end 68 of the first duct segment 64 and the entry end 72 of the second duct segment 70, or the flanges 76, 80 may be separate components secured to the duct segments 64, 70 by securing flange bolts 83 or other securing components capable of securing the flanges 76, 80 to the duct segments 64, 70.

The system 60 also has at least one link for securing the mated first and second structural duct segments 64, 70 to the exhaust flow path liner 62. The link 84 includes a stem 86 extending between a duct end 88 and an opposed liner end 90 of the link 84. FIG. 3 also shows a second link and securing structure 92 at the entry end 66 of the first structural duct segment 64 and a third link and securing structure 94 at the exit end 74 of the second structural duct segment 70. For purposes of efficiency, the second and third link if utilized and corresponding securing structures shown in FIG. 3 are not described in redundant detail, but are virtually the same as the structure of the first link 84 and its described, related securing components.

Figure 4:
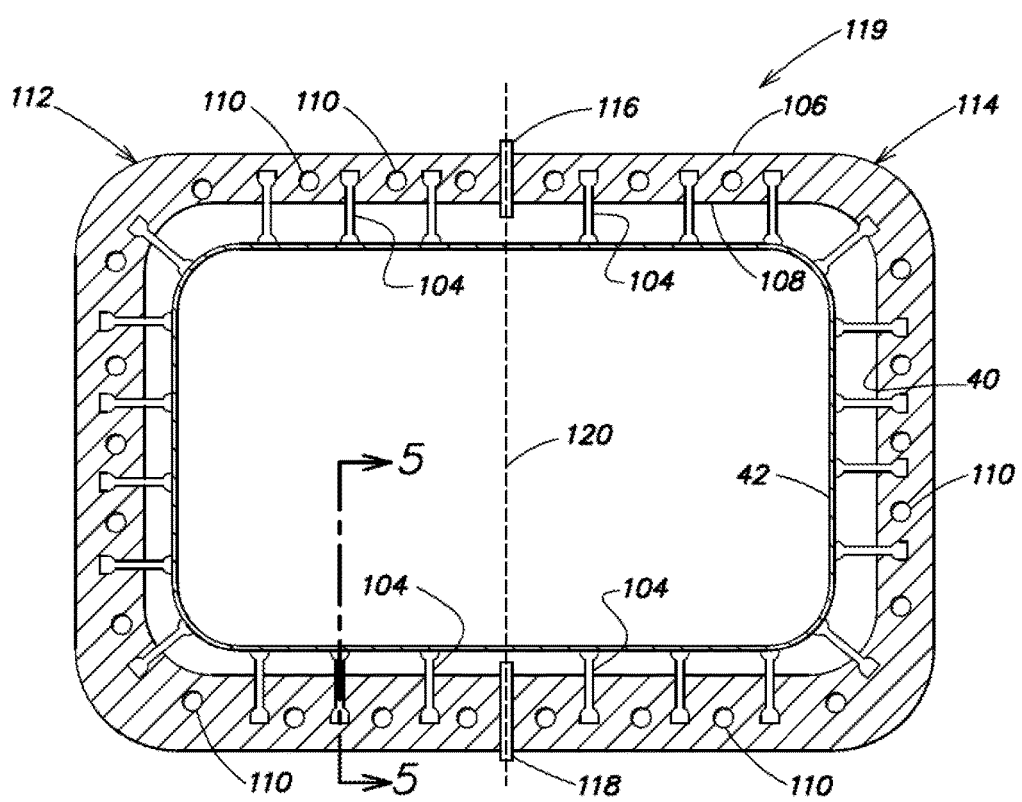
FIG. 4 is a cross-sectional view taken along view line 4-4 of FIG. 2, showing a first segment portion and a second segment portion forming a structural duct segment surrounding and securing with a plurality of links an exhaust flow liner within the structural duct segment.
Figure 5:
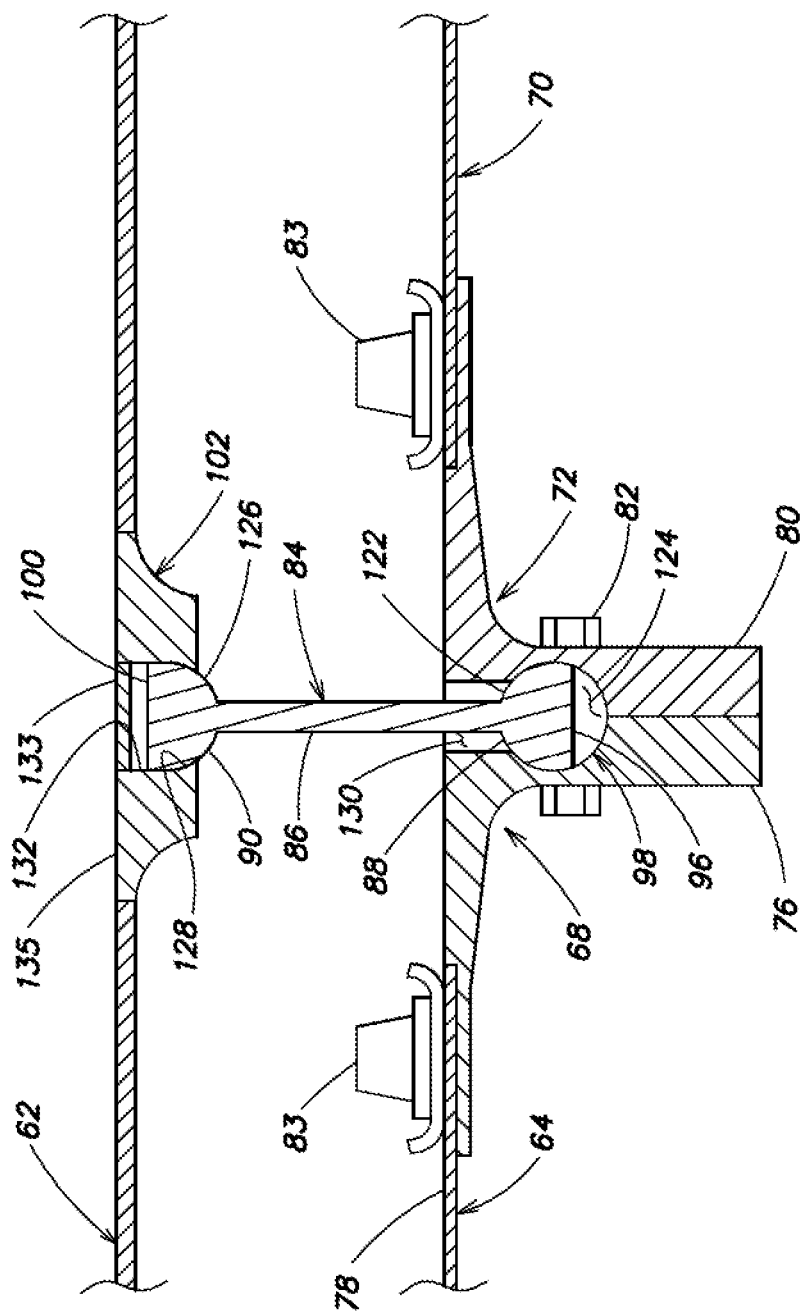
FIG. 5 is a fragmentary, plan view taken along view line 5-5 of FIG. 4 showing first and second junction flanges of first and second structural duct segments secured to each other and showing a link extending from a capture nest defined by the junction flanges to an attachment node of an exhaust flow liner to secure the duct segments to the liner in accordance with the present invention.

FIG. 4 shows a cross-sectional vi taken along view line 4-4 of FIG. 2, showing the structural exhaust duct 40 and the exhaust flow liner 42 secured within the duct 40 by a plurality of virtually identical links, identified by reference numeral 104 in FIG. 4 and by reference numeral 84 in FIG. 5. Details of the first link 84 and related securing structure are shown best in FIG. 5, which is a fragmentary, plan view taken along view line 5-5 of FIG. 4. The duct end 88 of the link 84 includes a lock member 96 having a diameter greater than a width of the stem 86. (For purposes herein, the phrase "having a diameter greater than" is to mean a longest linear distance between opposed points of the identified object such as opposed perimeter edges of the lock member 96. This definition is intended to embrace non-spherical lock members, such as lock barrels, etc.) (For purposes herein the term "a width" is to mean a shortest distance across opposed edges of an elongate object, such as a cylindrical or rectangular stem 86.)

The lock member 96 is also configured to be secured within a capture nest 98 that is cooperatively defined within the adjacent junction flanges 76, 80 of the first and second structural duct segments 64, 70. The stem 86 of the link 84 extends out of the capture nest 98 in a direction away from the lock member 96 and toward the exhaust flow path liner 62. The liner end 90 of the link 84 includes a catch member 100 configured to be secured to an attachment node 102 defined at the exhaust flow path liner 62 so that the link 84 secures the exhaust flow path liner 62 to the mated, secured structural duct segments 64, 70.

Also shown in FIG. 4 is an exemplary junction flange 106 (also shown in FIG. 2) that extends in a direction away from a flow surface 108 of the exhaust duct 40 and that is about perpendicular to the flow surface 108 of the exhaust duct 40. The junction flange 106 also defines a plurality of bolt holes 110 configured to receive the flange bolts 82 to secure the exemplary junction flange 106 to a second junction flange (not shown).

FIG. 4 also shows a first segment portion 112 and a second segment portion 114 that may be joined together to facilitate assembly or other desired functionality at a first flange attachment 116 and a second flange attachment 118 forming an exemplary structural duct segment 119 that surrounds the exhaust flow liner 42 and secures with the plurality of links 104 the exhaust flow liner 42 within the structural duct segment 119. FIG. 4 shows a hatched dividing line 120 running between the first and second flange attachments 116, 118 to facilitate understanding that the overall structural duct segment 119 is formed by the first and second segment portions 112, 114. While the structural duct segment 119 and other duct segments 64, 70 described herein may be formed of mirror-image first and second portions, it is to be understood that the structural duct segment 119 may be also formed of unequal sized portions. For example, a first segment portion may be in the shape of a sideways "U" while a second segment is in the shape of an "I" to form a duct segment surrounding a pre-assembled flow liner 42. Additionally, the structural duct segment 119 may be formed of a plurality of segment portions (not shown) for complex geometries of the exhaust flow liner 42.

As best shown in FIGS. 5, 6 the disclosure additionally includes the lock member 96 of the duct end 88 of the link 84 forming a spherical section 122 and the capture nest 98 defining a spherical cavity 124 so that the lock member 96 is pivotally secured within the capture nest 98 to thereby provide for pivoting motion of the stem 86, as best shown if FIG. 6. The pivoting motion accommodates relative displacement due to thermal growth and/or loading. Additionally, the catch member 100 at the liner end 90 of the stem 86 may also form a spherical section 126, and the attachment node 102 may also define a spherical cavity 128 so that the catch member 100 is pivotally secured within the attachment node 102 to thereby also provide for pivoting of the stem 86 extending from the attachment node 102, again as best shown in FIG. 6.

In another aspect of the exhaust system 60, to more firmly secure the duct end 88 of the stem 86 within the capture nest 98 defined by the junction flanges 76, 80, the capture nest 98 may include an access channel 130 as shown in FIGS. 5 and 6. The access channel 130 may also define a width that, greater than a width of the stem 86. This permits an unrestrained pivoting motion of the stem 86 within the access channel 130 whenever the lock member 96 is a spherical section 122 secured within the spherical cavity 124 defined by the capture nest 98.

In a further aspect of the disclosure, the attachment node 102 on the exhaust flow liner may define a throughbore 132 dimensioned to permit passage of the duct end 88 of the link 84 and the stem 86 to pass through the throughbore 132. The attachment node 102 may also include an installable cap 133 to cover the throughbore 132 on an exterior surface 135 of the attachment node 102 or liner 62 and to be flush with the exterior surface 135 to provide a smooth, continuous surface 135. This permits assembly of the exhaust system 60 by extending the duct end 88 of the link 84 and the stem 86 through the attachment node 102 throughbore 132, after which the duct end 88 is secured within the capture nest 98 between the exhaust duct segments 64, 70 as the segments 64, 70 are secured to each other.

In a further embodiment, the lock member 96 of the duct end 88 of the link 84 may have a greatest diameter that is less than a greatest diameter of the throughbore 132 of the attachment node 102, and the catch member 100 of the liner end 90 of the stem 86 may have a greatest diameter that is greater than the greatest diameter of the lock member 96 and that is less than a greatest diameter of the throughbore 132 of the attachment node 102. This permits the duct end 88 to pass through the throughbore 132 of the attachment node 102, while the liner end 90 is restricted from passing through the throughbore 132 of the attachment node 102.

FIG. 7 shows an adjustable and variable-length link 134 that may be utilized between the flow path liner 62 and the exhaust flow segments 64, 70 to provide limited motion of the exhaust duct segments 64, 70 to and away from the flow path liner 62. The adjustable, variable length link 134 provides a method for establishing a desired relationship between liner 62 and duct segment 64 and 70 accommodating dimensional tolerances and other causes of variation in a distance between the liner 62 and the duct segment 64. The variable-length link 134 includes a duct end 136 and an opposed liner end 138. A duct stem 140 extends away from the duct end 136 and includes a grab head 142 defining a diameter greater than a diameter of a piston stem 140. A lock sleeve 144 engages the grab head 142 so the grab head 142 may move toward and away from the duct end 136 within a grab chamber 146 defined within the lock sleeve 144. The lock sleeve 144 defines an entry slot 148 into the grab chamber 146, and the entry slot that has a diameter less than the diameter of the grab head 142 so that the grab head 142 is restricted from passing out of the grab chamber 146 through the entry slot 148. A liner stem 150 extends from the liner end 138 and includes a liner collar 152 configured to be secured to the lock sleeve 144. This configuration permits limited motion of the duct end 136 and duct stem 140 toward and away from the liner end 138 as the grab head 142 is captured within the grab chamber 146 of the lock sleeve 144 on the liner stem 150 and the grab head 142 moves within the grab chamber 146. The adjustable and variable-length link 134 also includes adjustable, variable-length link means 134 for adjusting a length of the link 134 prior to installation and varying the length of the link 134 during usage. Such alternative means include known apparatus and method of making and using an adjustable and variable-length rod, such as threaded sleeves receiving threaded rod ends, spring (metal or hydraulic) loaded receiving sleeves securing rod ends, etc.

The disclosure also includes a method of securing a plurality of structural duct segments 64, 70 to an exhaust flow path liner 62. The method includes securing a catch member 100 of a liner end 90 of a stem 86 to an attachment node 102 on the exhaust flow path liner 62; positioning a lock member 96 of a duct end 88 at the opposed end of the link 84 within a capture nest that is cooperatively defined between the first junction flange 76 at a first exit end 68 of the first structural duct segment 64 and the second junction flange 80 at a second entry end 72 of the second structural duct segment 70; and, then, securing the adjacent first and second junction flanges 76, 80 to each other thereby securing the lock member 96 of the duct end 88 of the link 84 within the capture nest 98 of the adjacent junction flanges 76, 80 so that the link 84 extends from the capture nest 98 in a direction above an interior flow surface 78 of the secured structural duct segments 64, 70 to the exhaust flow path liner 62, thereby securing the structural duct segments 64, 70 to the exhaust flow liner 62.

The method of securing a plurality of structural duct segments 64, 70 to an exhaust flow path liner 62 also includes, before the securing the adjacent first and second junction flanges 76, 80 to each other step, joining at least a first segment portion 112 to a second segment portion 114 to form at least one of the first and second structural duct segments 64, 70. The method may also include pivotally securing a spherical section 126 defined by the catch member 100 of the liner end 90 of the stem 86 within a spherical cavity 128 defined within the attachment node 102 on the exhaust flow path liner 62. Similarly, the method may include pivotally securing a spherical section 122 defined by the lock member 96 within a spherical cavity 124 of the capture nest 98 between the first and second flange segments 76, 80.

An additional method may include, before the securing the adjacent first and second junction flanges 76, 80 to each other step, passing the lock member 96 and stem 86 of the link 84 through a throughbore 132 defined within the attachment node 102; then securing the catch member 100 of the liner end 90 of the link 84 within the attachment node 102; positioning the lock member 96 of the duct end 88 of the link 84 within the capture nest 98; and, then, securing the adjacent first and second junction flanges 76, 80 to each other.

The present disclosure provides for efficient assembly and disassembly a plurality of structural duct segments 64, 70 surrounding and supporting the exhaust flow liner 62 in increments to minimize manufacture and assembly of large, complex exhaust system components. By securing the lock member of the link 84 between the duct segments 64, 70, fabrication of attachment apparatus on the interior flow surface 78 of the structural segments are required. This both minimizes obstructions to flow of cooling gases along the surface 78 and through the exhaust duct 40, and also simplifies manufacture and installation of link 84 securing components by use of the capture nest 98 within the junction flanges 76, 80 instead of on the interior flow surface 78 of the structural duct segments 64, 70. Use of modular, or detachable junction flanges 76, 80 provides for valuable flexibility in assembling the plurality of structural duct segments 64, 70 by providing for change in dimensions of the segments 64, 70 to effect precise alignment of the capture nest 98 of the structural duct segments 64, 70 with the attachment node 102 of the exhaust flow liner 62.

While the above disclosure has been presented with respect to the described and illustrated embodiments of an exhaust system 60 having a flow path liner 62 supported by structural duct segments 64, 70, it is to be understood that other embodiments are within the scope of this disclosure. For example, while the primary working environment of the present exhaust system 60 is within a gas turbine engine 10, it is to be understood that other apparatus may also generate hot gas streams passing through geometrically complex flow paths, such as pulse detonation engines, etc. Accordingly, reference should be made primarily to the following claims rather than the foregoing description to determine the scope of the disclosure.

What is claimed is:

1. An exhaust system for a gas turbine generating a hot exhaust stream, the exhaust system comprising:
   a. an exhaust flow path liner surrounding and defining an exhaust flow path of the hot exhaust stream;
   b. a first structural duct segment having a first entry end and a first opposed exit end, a second structural duct segment having second entry end and second opposed exit end, the first and second structural duct segments each including at each entry and exit end junction flanges extending perpendicular to and away from interior flow surfaces of the first and second duct segments so that a first junction flange at the first exit end of the first duct segment is configured to mate with a second junction flange at the second entry end of the second duct segment to secure the first and second structural duct segments together, forming mated first and second junction flanges and mated first and second structural duct segments; and,
   c. at least one link for securing the mated first and second structural duct segments to the exhaust flow path liner, the link including;
      i. a stem extending between a liner end and an opposed duct end;

ii. the duct end including a lock member having a diameter greater than a width of the stem, the lock member being configured to be secured within a capture nest defined cooperatively within the mated first and second junction flanges of the first and second structural duct segments so that the stem of the link extends out of the capture nest in a direction away from the lock member and toward the exhaust flow path liner; and iii. the liner end including a catch member configured to be secured to a liner node defined at the exhaust flow path liner so that the link secures the exhaust flow path liner to the first and second structural duct segments.

2. The exhaust system of claim 1, further comprising at least one of the first structural duct segment and the second structural duct segment including at least a first segment portion and a second segment portion configured so that at least the first and second segment portions cooperatively secure to each other to form the at least one of the first structural duct segment and the second structural duct segment completely surrounding the exhaust flow liner.

3. The exhaust system of claim 1, further comprising the lock member of the duct end of the link forming a spherical section, and the capture nest between the mated first and second junction flanges defining a spherical cavity so that the lock member is pivotally secured within the capture nest to thereby provide for pivoting motion of the stem.

4. The exhaust system of claim 1, further comprising the catch member at the liner end of the stem forming a spherical section, and the attachment node at the exhaust flow liner defining a spherical cavity so that the catch member is pivotally secured within the attachment node to thereby provide for pivoting of the stem of the link extending from the attachment node.

5. The exhaust system of claim 3, further comprising the capture nest defining an access channel between the capture nest and the interior flow surface of the duct segments, the access channel defining a width that is greater than a width of the stem of the link to thereby permit pivoting motion of the stem within the access channel.

6. The exhaust system of claim 1, wherein the attachment node on the exhaust flow liner defines a throughbore dimensioned to permit passage of the duct end and the stem of the link to pass through the throughbore, the throughbore including a cap flush with an exterior surface of the exhaust flow liner to provide a smooth, continuous exterior surface.

7. The exhaust system of claim 6, wherein the lock member of the duct end of the link defines a diameter of the lock member that is less than a diameter of the throughbore of the attachment node, and the catch member of the liner end of the stem defines a diameter of the catch member that is greater than the diameter of the lock member and that is greater than the diameter of the throughbore of the attachment node, to thereby permit the duct end to pass through the throughbore of the attachment node, while restricting the liner end from passing through the throughbore of the attachment node.

8. The exhaust system of claim 1, wherein the link securing the mated first and second structural duct segments to the exhaust flow path liner further comprises an adjustable, variable-length link means for adjusting a length of the link prior to installation of the link between the structural duct segments and exhaust flow path liner and for varying the length of the link after installation of the link between the first and second structural duct segments and the exhaust flow path liner.

9. A method of securing a plurality of structural duct segments to an exhaust flow path liner of an exhaust system of a gas turbine generating a hot exhaust stream, the method comprising:

a. securing a catch member of a liner end of a link to an attachment node on the exhaust flow path liner, wherein the exhaust flow path liner surrounds and defines an exhaust flow path of the hot exhaust stream;

b. positioning a lock member of a duct end at an opposed end of the link within a capture nest that is cooperatively defined between a first junction flange at a first exit end of a first structural duct segment of the plurality of structural duct segments and a second junction flange at a second entry end of a second structural duct segment of the plurality of structural duct segments, wherein the first and second junction flange extends perpendicular to and away from interior flow surfaces of the plurality of duct segments;

c. securing the first and second junction flanges to each other, forming adjacent first and second junction flanges, thereby securing the lock member of the duct end of the link within the capture nest of the adjacent junction flanges so that the link extends from the capture nest in a direction above an interior flow surface of the first and second structural duct segments to the exhaust flow path liner thereby securing the first and second structural duct segments to the exhaust flow path liner.

10. The method of securing a plurality of structural duct segments to an exhaust flow path liner of claim 9, further comprising, before securing the adjacent first and second junction flanges to each other, joining at least a first segment portion to a second segment portion to form at least one of the first and second structural duct segments.

11. The method of securing a plurality of structural duct segments to an exhaust flow path liner of claim 9, further comprising, pivotally securing a spherical section defined by the catch member of the liner end of the link within a spherical cavity defined within the attachment node on the exhaust flow path liner.

12. The method of securing a plurality of structural duct segments to an exhaust flow path liner of claim 9, further comprising pivotally securing a spherical section defined by the lock member of the duct end of the link within a spherical cavity defined by the capture nest between the first and second junction flanges.

13. The method of securing a plurality of structural duct segments to an exhaust flow path liner of claim 9, further comprising, before securing the adjacent first and second junction flanges to each other, passing the lock member and stem of the link through a throughbore defined within the attachment node; securing the catch member of the liner end of the link within the attachment node; positioning the lock member of the duct end of the link within the capture nest; and, then, securing the adjacent first and second junction flanges to each other.

14. The method of securing a plurality of structural duct segments to an exhaust flow path liner of claim 9, further comprising wherein the link is an adjustable, variable-length link and varying a length of the link securing the structural duct segments to the exhaust flow liner to accommodate initial link tensile loading and thermal expansion and contraction between the structural duct segments and the exhaust flow liner.

* * * * *